US008056060B2

(12) United States Patent
Bicheno et al.

(10) Patent No.: US 8,056,060 B2
(45) Date of Patent: Nov. 8, 2011

(54) SOFTWARE TESTING METHOD AND SYSTEM

(75) Inventors: Richard Michael Bicheno, Hampshire (GB); Kevin Anthony Braithwaite, Hampshire (GB); Marc Stanley Carter, Lodon (GB); Tim Dunn, Hampshire (GB); Michael George Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 11/758,168

(22) Filed: Jun. 5, 2007

(65) Prior Publication Data

US 2008/0046791 A1 Feb. 21, 2008

(30) Foreign Application Priority Data

Jun. 16, 2006 (GB) .................... 0611960.6

(51) Int. Cl.
G06F 9/44 (2006.01)
G06F 9/45 (2006.01)
(52) U.S. Cl. .................. 717/127; 717/131; 717/154
(58) Field of Classification Search .................. 717/124
See application file for complete search history.

(56) References Cited

U.S. PATENT DOCUMENTS

| | | | | |
|---|---|---|---|---|
| 5,742,754 A * | 4/1998 | Tse | ................. | 714/38 |
| 6,002,869 A * | 12/1999 | Hinckley | ................. | 717/124 |
| 6,173,440 B1 * | 1/2001 | Darty | ................. | 717/130 |
| 6,668,340 B1 | 12/2003 | Baker et al. | | |
| 7,490,319 B2 * | 2/2009 | Blackwell et al. | ............ | 717/124 |
| 2005/0166094 A1 | 7/2005 | Blackwell et al. | | |
| 2008/0184206 A1 * | 7/2008 | Vikutan | ................. | 717/127 |
| 2009/0089005 A1 * | 4/2009 | Hopcraft et al. | ............ | 702/123 |

OTHER PUBLICATIONS

A Data Analysi Method for Software Performance Prediction, author: Gianluca Bontemp, 2002 IEEE, Proceeding of the 2002 Design, Automation and Test in Europe Conference and Exhibition (Date'02), <http://ieeexplore.ieee.org/stamp/stamp.jsp?tp=&arnumber=998417>.*
Improved Automatic Testcase Synthesis for Performance Model Validation, author: Robert H. Bell, Jr. ICS'05, Jun. 20-22, Boston, MA, USA. ACM 1-59593-167-Aug. 6, 2005, <http://delivery.acm.org/10.1145/1090000/1088164/p111-bell.pdf>.*
Benchmarking Optimization software with performance profiles, author: Elizabeth D. Dolan. Springer-Verlag 2001, Received: Feb. 2001/Accepted: May 2001. Digital Object Identifier (DOI) 10.1007/s101070100263, <http://www.springerlink.com/content/t2ej6w4975m83epx/fulltext.pdf>.*

(Continued)

Primary Examiner — Thuy Dao
Assistant Examiner — Cuong V Luu
(74) Attorney, Agent, or Firm — Cuenot, Forsythe & Kim, LLC

(57) ABSTRACT

A software product is tested by first obtaining a performance matrix for the software product, the performance matrix containing the profile results of a plurality of tests on the software product, and an expected result vector for the plurality of tests. A test sequence is then executed for the software product, the sequence comprising selecting a subset of the plurality of tests, running the test subset to obtain a new result vector for the test subset, comparing the new result vector entry with the expected result vector entry for the same test, selecting a test (which may be one of the subset or may be a new test) according to the outcome of the result vector comparison and the performance matrix, and running the selected test under profile.

20 Claims, 2 Drawing Sheets

OTHER PUBLICATIONS

Model Validation and Testing: The Methodological Foundattion of ASHRAE Standard 140, author: R. Judkoff, National Renewable Energy Laboratory, conference Paper NREL/CP-550-40360, Jul. 2006, <http://citeseerx.ist.psu.edu>.*

Test Prioritization Tool, http://www.tacc.utexas.edu/services/userguides/intel8/cc/c_ug/f_ug2/pgo_prior.htm 8 pages, retrieved on Jun. 5, 2007.

Schaefer, Hans, "Risk Based Testing, Strategies for Prioritizing Tests against Deadlines", Methods & Tools (Winter 2005), www.methodsandtools.com/archive/archive/php?id=31.

Amland, Stale, "Risk Based Testing and Metrics; Risk Analysis Fundamentals and Metrics for software testing including a Financial application case study", 5th International Conference, EuroSTAR '99,www.amland.no/WordDocuments/EuroSTAR99Paper.doc (Nov. 8-12, 1999, Barcelona, Spain).

Strobie, Keith, "Too Darned Big to Test", ACM Queue, vol. 3, No. 1 (Feb. 2005).

Holden, Ian, et al., "Improving Testing Efficiency Using Cumulative Test Analysis", Proceedings of the Testing: Academic & Industrial Conference on Practice and Research Techniques, pp. 152-158 (2006).

"Analyze Your Testing and Shorten Your Test Cycles", www.mccabe.com/iq_test.htm 5 pages, retrieved on May 3, 2007.

* cited by examiner

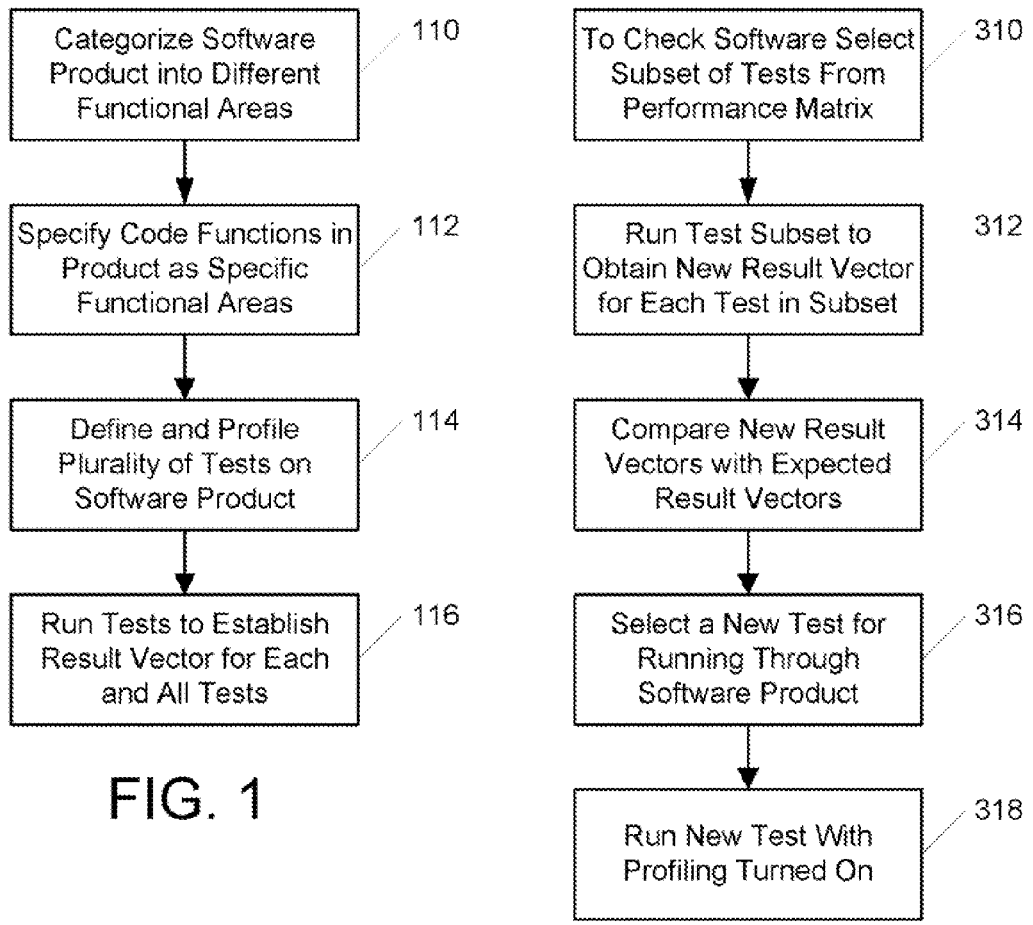
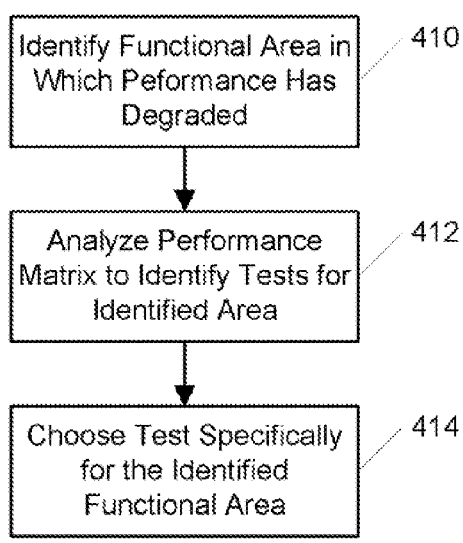
FIG. 1
FIG. 2
FIG. 3

SOFTWARE TESTING METHOD AND SYSTEM

FIELD OF THE INVENTION

This invention relates to a software testing method and system. The method and system support the autonomic detection of software performance defects.

BACKGROUND OF THE INVENTION

In complex software products which have many interacting capabilities such as message parsing, message tree navigation, business logic etc., it can be extremely difficult to isolate performance problems. Running one or two tests and profiling them is unlikely to show the cause of the performance problem unless it is obvious. There is also the problem that regression test suites can grow exponentially in size when more product features are included. Not all these tests can be run all the time. Together, these lead to a lengthy manual process of performance investigation when performance degradation is reported by automatic tests.

U.S. Pat. No. 6,668,340 discloses a method, system and program for determining a test case selection for a software application. Multiple risk values are assigned to each of the test cases of a software application, wherein the multiple risk values represent multiple types of risks associated with the software application not performing each function. An acceptable level of risk is designated. Only a subset of the test cases of the software are selected to test, wherein the subset comprises the test cases assigned risk values that exceed the acceptable level of risk. Such a testing system inherently does not test the entire functionality of a software product which may be a practical solution for saving time, but cannot be guaranteed to test the entire software product for degradation.

SUMMARY OF THE INVENTION

According to a first aspect of the present invention, there is provided a method for testing a software product comprising obtaining a performance matrix for the software product, the performance matrix containing the profile results of a plurality of tests on the software product, and an expected result vector for the plurality of tests, executing a test sequence for the software product comprising selecting a subset of the plurality of tests, running the test subset to obtain a new result vector for the test subset, comparing the new result vector entry with the expected result vector entry for the same test, selecting a test according to the outcome of the result vector comparison and the performance matrix, and running the selected test under profile.

Preferably a matrix of test names and weightings is provided which reflect the proportion of usage of the different functional areas of the product in each test. The tests are then run as a sequence. By analyzing the test results and using the matrix which describes functional coverage it is possible to determine which area of the product is most degraded.

By analyzing the matrix it is preferably possible to determine which areas of the product are most heavily degraded. It is also preferably possible to determine which test is the best test case to demonstrate the problem. Under automation it is then possible to run the particular test case with profiling enabled this time. This provides the developer with an execution profile which has been automatically obtained using the most relevant test case following observation of the degradation.

For certain products (and certainly for tests distributed over several products or physical systems) code-profiling may not be a global on/off parameter but more fine grained, this solution allows us to focus (automatically) on the functional area with greatest affect.

The matrix can also be used to select which of the tests are the most orthogonal (particularly if the functional areas have been self categorised by the system). This is the performance equivalent of code coverage. These tests can, therefore, be the small daily set.

BRIEF DESCRIPTION OF THE DRAWINGS

Embodiments of the present invention will now be described, by way of example only, with reference to the accompanying drawings, in which;

FIG. 1 is a flowchart of a method of obtaining a performance matrix and result vector for a plurality of tests on a software product;

FIG. 2 is a flowchart of a portion of a software testing method;

FIG. 3 is a flowchart of an expansion of a step in the process on FIG. 2; and

DETAILED DESCRIPTION

Figure 4:
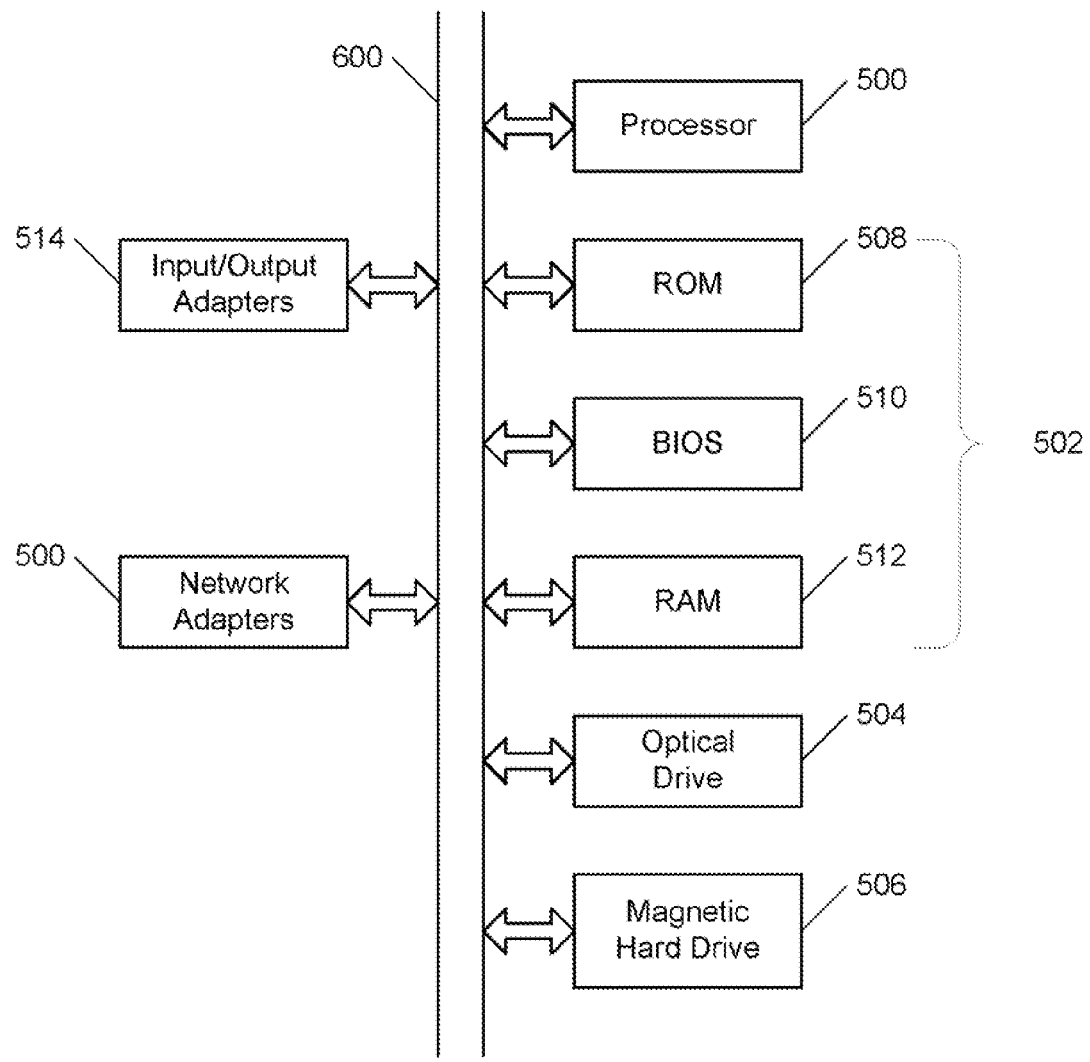
FIG. 4 is a schematic representation of the hardware elements of a computer system in which the present invention may be implemented.

To test a complex software product, such as a messaging application, it is necessary to generate standard data for the product, which can be used in the testing process, as a benchmark. This standard data is generated by the software vendor, and can be used as a way of testing the software product as it is built, or can be used after the sale of the product to a third party, as a way of testing that the software product is functioning properly. Such an after-sale testing scenario can be executed periodically, or after a significant change has occurred in the operation of the software product.

FIG. 1 relates to the steps taken to generate a performance matrix and test result vectors for the software product, which forms the standard benchmarking data. The first step 110, is for the product to be categorized into functional areas. These functional areas can be pre-selected by human users who have knowledge of the code and the likely composition of the distribution of processing. As an example, which will be referred to throughout this description, a software product is defined has having four main functional areas (although other software products could have many more). These four functional areas are:

ESQL—consists of code which performs business logic.
Navigation—code which traverse the business model,
Parsing—parsing code which parses messages into the business model, and
Communication—communication code handles the transmission of messages to/from the product.

Once the product has been classified into functional areas, step 112 assigns each of the various code functions in the product to one of the functional areas defined in step 110. Developers and/or performance analysts may draw up a table that specifies which code functions within the software product ail within which product functional area. For example, code function x is categorized as navigation. The developers have ample product knowledge to know the code functions to categorize or can get a definitive list of code functions which could be used with a profiling tool to analyse the various product areas. A profiling tool such as Vtune (from Intel) could be used in this task.

The data provided by Vtune includes a list of all functions invoked during a particular test as well as how often the function is called, how much time was spent in that function only (self time), how much time was spent in that function and others it may have called within it (total time). Other data such as which class the function is from is also available.

Profiling can be carried out at the module, class or function level. In fact profiling can be executed at multiple levels, which will allow an end user who is testing a product to choose the level at which they wish to work. The output from step 112 is a list of functions in the product code and to which of the functional areas these individual functions apply. An example section of such a list is shown below:

| Function Name | Class Name | Functional Area |
| --- | --- | --- |
| scanCharData | DGXMLScanner | Parser |
| ScanEndTag | DGXMLScanner | Parser |
| parseNextItem | XmlBrokerAsgardParser | Parser |
| senseNextToken | XMLScanner | ESQL |
| scanStartTag | DGXMLScanner | Navigation |

Once step 112 has been completed for the software product, step 114 is performed to define and profile tests which exercise the different functional areas of the product. A series of orthogonal tests are defined which exercise different functional areas of the product. There may also be some general or scenario tests that are useful to be run on, for example, a daily basis. It is to be expected that product testers will be able to develop test cases to exercise the different product functions.

Each test is run and profiled, with a tool such as Vtune, and the output is analyzed (an original profile is outputted). This analysis will look at the total time a test took to run. This can be obtained from the total time of the very first function invoked for the test. For each function, the time spent (self time) is added to the total for its functional area. After the Vtune data has been analyzed in this way for each test it is possible to determine how much processing time was spent in each functional area of the product. This allows weighting data as a % weight to be assigned to each of the tests, which reflects the distribution of processing over each of the functional areas. This gives a performance matrix made up of tests and functional areas exercised (in differing proportions). An example performance matrix of test versus functional area (note: rows sum to 100%), for the example product discussed in this description is:

| Test Name | Parsing | Navigation | ESQL | Communication |
| --- | --- | --- | --- | --- |
| T1 | 90 | 5 | 5 | 0 |
| T2 | 50 | 20 | 15 | 15 |
| T3 | 20 | 50 | 15 | 15 |
| T4 | 0 | 10 | 40 | 50 |

Once the performance matrix has been generated for the software product (which may have tests numbering in the hundreds), step 116 is executed, which runs the tests (T1 to Tn) to establish expected results for the software product. The tests defined in step 114 are run without using profiling and the results gathered. For the example product, the relevant metric for tests is number of messages processed per second. Hence from this an expected result vector containing the par value (expected message rate from test) for each test can be generated, an example of which is shown below, which defines the entries in an expected result vector, one for each test:

| Test Name | Expected Result Vector |
| --- | --- |
| T1 | 1500 |
| T2 | 1000 |
| T3 | 500 |
| T4 | 800 |

At this point, for the specific software product there exists a set of tests, and for each test it is known how much of each functional area of the product that test exercises, and also what the expected result vector for each test should be. This benchmarking information can be stored with the product, ready for when any actual test takes place, or can be recalled as needed when the product is to be tested.

For example, to keep a check on product performance throughout the software development cycle, a number of tests will need to be run against each build of the product. Product builds are typically done daily and contain all the latest written code from developers.

FIG. 2 is a flowchart of the test sequence earned out on the software product once the benchmark data of the performance matrix and expected result vectors have been obtained.

The first step 310 is to select a subset of the plurality of tests, developed in step 114 of FIG. 1, to run against the latest build. A subset of the tests is used because running all of tests, in most cases, will be too time consuming. The tests may number in the thousands, and specific individual tests may take days to run through the software product. Which tests to use, of the plurality of tests in the performance matrix, may be recalled from storage or a time threshold may be applied to filter the tests. For example, it may be decided that T1 takes too long to run so it is excluded from the daily test run. In addition it can be seen that T2 has 50% coverage of parsing and should help to identify any degradations in that area. In this example, tests T2, T3 and T4 are selected to form the test subset.

At step 312, the chosen tests in the test subset are run to produce a new result vector containing entries for each test (in the same way that the expected result vector was generated, but for the latest build). These test results could be:

| Test Name | New Result Vector |
| --- | --- |
| T2 | 750 |
| T3 | 450 |
| T4 | 800 |

Once the results have been generated, each entry in the new result vector is compared (step 314) with the corresponding entry in the expected result vector for the same test. The expected values for T2, T3 and T4 are 1000, 500 and 800 respectively. From this it can be seen that tests T2 and T3 have generated an under par entry in the result vector, indicating that the respective schemes that make up tests T1 and T2 have indicated a degradation in the performance of the software product.

Following the comparison process, the next step is stage 316, where it is desired to select a test to run on the software product. FIG. 3 shows one example of the steps that could be taken to determine which new test is to be run on the software product.

It can be assumed that the test results above signal a drop in performance in the Parser functional area. From the entries in the new result vector it can be seen that two of the tests in the test subset show degraded results. Test T2 has a greater degradation than T3. The weighting percentages in the performance matrix suggest the problem is likely to be somewhere in the Parser code. This is step 410 of FIG. 3, whereby the functional area in which performance has degraded is identified.

A test is to be run with profiling turned on to analyze the degradation problem. In the example above, there is the possibility of rerunning T2, but a better solution is to pick the test with the highest % weight in the Parser functional area. At step 412, the original performance matrix is analyzed to find the most suitable tests, and at step 414 the most suitable is selected, which is test T1 (90% time in Parser processing). The running of this test will present a developer with a profile of the degraded area using a test which best shows the degradation.

Referring back to FIG. 3, once the test case to profile is selected, that test will be run (step 318) under profile, but on the latest build. The developer (although this could be automated) would be able to look at the parser functions in this profile and in the original profile and compare the time taken in each function. Any function which now takes longer is likely to be a source of a degradation.

By way of example, three of the parser functions may have the same number of calls as the original profile but the self time of each function may have increased which indicates these functions are now taking longer and are areas the developer should investigate as a source for the performance degradation.

In this way, a testing solution is provided that enables the autonomic detection of degraded performance in complex software where there may be multiple behaviors taking place. This is achieved through an automated system of analysis and automated profiling. No user input is required to identify the area of the product which is not functioning fully, and data relating to the degradation is provided as an output of the system. This automation of the process of detection provides significant productivity gains because the developer is presented with the evidence, rather than having to spend time on finding the likely area of the degradation.

The software testing may be carried out on a general purpose computer system of the type shown in FIG. 4 that includes an internal system bus 600 that interconnects a system processor 500, internal memory components 502 and one or more "external" memory components, such as an optical drive 504 and a magnetic hard drive 506. The internal memory itself includes specific types of memory such as read only memory (ROM) 508, basic input/out system (BIOS) memory 510 and random access memory (RAM) 512. The BIOS memory 510 stores configuration information for the computer system and basic routines used to control the transfer of information among the components of the computer system.

Drives, such as optical drive 504 and magnetic hard drive 506, provide non-volatile storage for applications and processes that execute in the computer system and for data used in and/or generated by those applications and processes. Depending on the technology employed, the drives may include removable media. The special purpose programming needed by a computer system to implement the described invention would typically be stored in one of these drives and transferred as needed into RAM.

The computer system would also include a significant number of input/output (I/O) adapters 514 that provide interfaces between a variety of input/output devices and the remainder of the computer system. Common examples of input/output devices include keyboards, mice, monitors and printers. It should not be implied that only the previously named devices can be part of the computer system. Moreover, it should not be implied that the input/output adapters are limited to a particular technology. There are many different types of input/output adapters that are used as device interfaces. Current examples of adapter technologies that are successfully used include not only specific device adapters but also general use ports such as serial ports, parallel ports, SCSI ports, USB ports, FireWire ports and infrared ports. Such general use ports can be used to provide connections to not only traditional I/O devices but also to such components as memory keys, portable hard drives, fingerprint readers, etc. Other port technologies undoubtedly already exist or will be developed.

Finally, the computer system will include one or more network adapters 516 that are needed to establish communications between the computer system and other computers. Many different types of network adapters exist today and there is no intent to limit the system to a particular type.

What is claimed is:

1. A method for testing a software product comprising:
   obtaining a performance matrix for the software product, the performance matrix containing the profile results of a plurality of tests on the software product, and an expected result vector for the plurality of tests; and
   executing a test sequence for the software product comprising
      selecting a subset of the plurality of tests,
      running the test subset to obtain a new result vector for the test subset,
      comparing the new result vector entry with the expected result vector entry for the same test,
      selecting a test according to the outcome of the result vector comparison and the performance matrix, and
      running the selected test under profile.

2. A method according to claim 1 wherein the profile results, for each test stored in the performance matrix, comprise weighting data for each of a plurality of functional areas.

3. A method according to claim 2 wherein the step of selecting a test according to the outcome of the result vector comparison and the performance matrix includes identifying a functional area in which performance has degraded.

4. A method according to claim 3 wherein the step of selecting a test according to the outcome of the result vector comparison and the performance matrix includes choosing a test specifically for the functional area in which a degraded performance is detected.

5. A method according to claim 4 wherein the selected test to be run under profile is not a member of the test subset.

6. A method according to claim 4 wherein the step of selecting a subset of the plurality of tests comprises recalling a predefined test subset.

7. A method according to claim 4 wherein the result vector contains numerical values.

8. A system for testing a software product comprising a storage device storing a performance matrix for the software product the performance matrix containing the profile results of a plurality of tests on the software product, and an expected result vector for the plurality of tests, and a processor arranged to execute a test sequence for the software product comprising:
selecting a subset of the plurality of tests,
running the test subset to obtain a new result vector for the test subset,
comparing the new result vector entry with the expected result vector entry for the same test,
selecting a test according to the outcome of the result vector comparison and the performance matrix, and
running the selected test under profile.

9. A system according to claim 8 wherein
the profile results, for each test stored in the performance matrix, comprise weighting data for each of a plurality of functional areas.

10. A system according to claim 9 wherein
the processor is arranged, when selecting a test according to the outcome of the result vector comparison and the performance matrix, to identify a functional area in which performance has degraded.

11. A system according to claim 10 wherein
the processor is arranged, when selecting a test according to the outcome of the result vector comparison and the performance matrix, to choose a test specifically for the functional area in which a degraded performance is detected.

12. A system according to claim 10 wherein
the selected test, to be am under profile is not a member of the test subset.

13. A system according to claim 10 wherein
the processor is arranged, when selecting a subset of the plurality of tests, to recall a predefined test subset.

14. A computer program product comprising a computer usable storage medium having stored therein computer usable program code for testing a software product, the computer usable program code, which when executed in a computer, causes the computer to perform:
obtaining a performance matrix for the software product, the performance matrix containing the profile results of a plurality of tests on the software product, and an expected result vector for the plurality of tests; and
executing a test sequence for the software product comprising:
selecting a subset of the plurality of tests,
running the test subset to obtain a new result vector for the test subset,
comparing the new result vector entry with the expected result vector entry for the same test and the performance matrix,
selecting a test according to the outcome of the result vector comparison and the performance matrix, and
running the selected test under profile.

15. A computer program product according to claim 14 wherein
the profile results, for each test stored in the performance matrix, comprise weighting data for each of a plurality of functional areas.

16. A computer program product according to claim 15 wherein
the program instructions for causing the computer to perform the step of selecting a test according to the outcome of the result vector comparison and the performance matrix, includes further program instructions for causing the computer to identify a functional area in which performance has degraded.

17. A computer program product according to claim 16 wherein
the program instructions for causing the computer to perform the step of selecting a test according to the outcome of the result vector comparison and the performance matrix, includes program instructions that cause the computer to perform the step of choosing a test specifically for the functional area in which a degraded performance is detected.

18. A computer program product according to claim 17 wherein
the selected test to be run under profile is not a member of the test subset.

19. A computer program product according to claim 17 wherein
the program instructions for causing the computer to perform the step of selecting a subset of the plurality of tests comprises program instructions for causing the computer to perform the step of recalling a predefined test subset.

20. A computer program product according to claim 17 wherein
the result vector contains numerical values.

* * * * *